United States Patent [19]
McLain

[11] 3,887,479

[45] June 3, 1975

[54] PROCESS FOR PREPARATION OF FERRITES

[75] Inventor: Joseph H. McLain, Chestertown, Md.

[73] Assignee: United States of America as represented by the Secretary of the Navy, Washington, D.C.

[22] Filed: Oct. 30, 1973

[21] Appl. No.: 411,105

[52] U.S. Cl. ............ 252/62.64; 252/62.56; 423/594
[51] Int. Cl.² C04B 35/36; C04B 35/26; C01G 49/00
[58] Field of Search ....... 423/594; 252/62.64, 62.56

[56] References Cited
UNITED STATES PATENTS

| | | | |
|---|---|---|---|
| 3,305,349 | 2/1967 | Bovarmick et al. | 423/594 UX |
| 3,378,335 | 4/1968 | Ellis et al. | 423/594 X |
| 3,428,416 | 2/1969 | Gie et al. | 423/594 |
| 3,645,672 | 2/1972 | Cowland et al. | 423/594 |
| 3,743,707 | 7/1973 | Iwase et al. | 423/594 |
| 3,751,366 | 8/1973 | Bomar et al. | 423/594 X |

FOREIGN PATENTS OR APPLICATIONS

| | | | |
|---|---|---|---|
| 739,069 | 10/1955 | United Kingdom | 423/594 |
| 651,591 | 8/1965 | Belgium | 423/594 |

*Primary Examiner*—Herbert T. Carter

[57] ABSTRACT

Metallic ferrites are prepared by forming a solution of metallic sulfate and a ferrous sulfate. A mixed sulfate is formed when the solvent in the solution is evaporated. Heat transforms the mixed sulfate into the corresponding ferrite.

12 Claims, No Drawings

PROCESS FOR PREPARATION OF FERRITES

BACKGROUND OF THE INVENTION

This invention relates to a process for making an inorganic compound and more particularly to a process for making a metallic ferrite.

It is well established that purity and accurate reproducibility is always a desirable feature in many arts. Purity and accurate reproducibility are especially desirable in many processes which are used to make compounds. The pure and reproducible compounds are especially important in the computer field and related electronic arts, because purity and reproducibility of compounds have a directly proportional effect on the functioning of electronic devices.

In other words, purity and reproducibility are critical to the electronic performance of compounds. It follows that processes which produce such components are very useful to the electronic arts. These reproducible electronic properties are particularly important when the compounds are used in a memory device of a high speed digital computer as set forth by J. A. Rajchman in his article in *RCA Review*, "Static Magnetic Matrix Memory, and Switching Circuits," Volume 13, Number 2, pages 183–201, 1952.

Many processes are designed to produce the desired compounds with the desired purity and reproducibility, especially in the case of highly usable metallic ferrites. Ferrous oxide and a metallic oxide have been purified, and ball milled together in order to form a ferrite. However, the starting materials have proven difficult to purify and mix together in the proper ratios. Thus the process could not give the desired reproducible and pure ferrite compound. Attempts have also been made to produce a ferrite from a solution. However, a solution process has not yet been the complete answer. Thus, producing a metallic ferrite having the necessary purity and reproducibility for use in electronic devices remains a problem in the art.

SUMMARY OF THE INVENTION

Accordingly it is an object of this invention to provide a process for producing a metallic ferrite.

It is also an object of this invention to provide a process for producing a pure metallic ferrite.

It is also an object of this invention to more simply produce a metallic ferrite suitable for use in electronic arts.

These and other objects of the invention are met by providing a process wherein a solution containing a metallic sulfate and ferrous sulfate is formed; the solvent is removed; a mixed sulfate is formed; and the mixed sulfate is heated to form a ferrite. Thus a solution process can now produce the desired results of reproducibility and purity.

DESCRIPTION OF THE PREFERRED EMBODIMENT

It is now known that the desired reproducible and pure metallic ferrites are obtained by a sulfate precipitation process and heating. Possibly this process is operable because it is now believed that metallic ferrites can be made in compliance with the laws of crystalline morphology. Crystalline morphology requires specific, and reproducible sites at an ionic scale. The sites result in reproducibility from batch to batch and homogeneity of the spinel lattice. Also for crystalline morphology to be maintained, the reaction to form the crystal must be complete. This mechanism is considered a possible explanation for the improvement in the making of metallic ferrites, but other mechanisms are not ruled out. It is, however, known that this process meets the objects of the invention including making a pure and reproducible metallic ferrite having the desired properties for use in the electronic arts.

The desired features of the metallic ferrite are achieved by making a mixed sulfate crystal and heating to form the ferrite. A suitable process for forming the metallic ferrite involves forming a solution of ferrous sulfate, and forming a solution of a metallic sulfate. The metallic sulfate is selected so that the same metallic ion is in the metallic sulfate as in the metallic ferrite. The solution of ferrous sulfate is then mixed with the solution of metallic sulfate. Evaporation of the solvent in the solution follows. Alternatively, the solutes, ferrous sulfate and metallic sulfate can be dissolved in the same solvent, thus eliminating the necessity for making two solutions. Standard evaporation procedures then follow to form the mixed sulfate. A crystal of mixed sulfate is recovered from either process of making the sulfate solution after evaporation of the solvent. The mixed sulfate is then heated to form the ferrite. A possible reaction mechanism, wherein M is a metal, is:

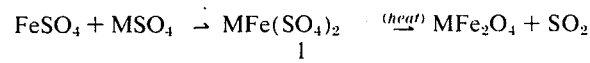

$$FeSO_4 + MSO_4 \rightarrow MFe(SO_4)_2 \xrightarrow{(heat)} MFe_2O_4 + SO_2$$
$$1$$

However, other reaction mechanisms are possible.

Appropriate ratios of ferrous sulfate to the metallic sulfate range from 1:1 to 4:1. However a desired ratio is 2:1. The desired concentration in the solution of ferrous sulfate is up to saturated with saturated being the preferred concentration. Similar limitations of the metallic sulfate are desirable. Up to a saturated solution is operable for the metallic sulfate with a saturated solution being more desirable.

If two solutions are made and then mixed to form the mixed sulfate, temperature and mixing time are not critical. However, a suitable temperature range for the mixing is 20°C to 110°C. A desirable mixing temperature is around 100°C. Substantially, instantaneous mixing is most suitable at the desirable mixing temperature around 100°C because evaporation and formation of the sulfate crystal is formed. The crystal thus formed is then heated at a temperature as low as possible to form the metallic ferrite. In most cases the lowest desirable heating temperature is 200°C to form the metallic ferrite. Heating continues until the desired ferrite is formed. The highest possible temperature is below the decomposition temperature of the compounds involved.

These desirable results are probably obtained because of the laws of morphology of crystal growth. This process is believed to set up the ferrous ion as the host material. The host material must have the same number of ions in the same position of the lattice each time the crystal is formed. Thus when the solutions of ferrous sulfate and the metallic sulfate are formed, the crystal that is formed must be the same from each of the solutions used. The same ion mixture is achieved each time. Ball milling, other mixing means, and other solutions do not achieve this consistent reproducibility.

Desired metallic ferrites are made by mixing ferrous sulfate' with sulfates of other metals such as nickel sulfate, manganese sulfate, copper sulfate, magnesium sulfate, zinc sulfate, and a mixture of magnesium and manganese sulfate. Of the metals that have more than one valence, the preferred sulfates are nickel II sulfate, manganese II sulfate, and copper II sulfate.

The solvent used in forming the solutions is water. Acidification of the water is 0.5 to 5% sulfuric acid by weight of solutions aids in forming the solution with 1.0% sulfuric acid being desirable. The concentration of sulfuric acid used is usually about 6 normal although this concentration can be varied.

The examples which follow are presented only to illustrate the invention and not to unduly limit the scope of the invention. All ratios, parts, and percentages, in the specification, claims, and examples are based on moles of the metal ion unless otherwise defined.

EXAMPLE I

In the preparation of copper II ferrite a solution containing 67% $FeSO_4 \cdot 7H_2O$ and 33% $CuSO_4 \cdot 5H_2O$ is prepared. First a saturated solution of $FeSO_4 \cdot 7H_2O$ is made by dissolving the $FeSO_4 \cdot 7H_2O$ in 500 militers water and 5 ml of 6N sulfuric acid. Then a saturated solution of $CuSO_4 \cdot 5H_2O$ is made by dissolving the $CuSO_4 \cdot 5H_2O$ in a mixture of 250 ml water and 2.5 ml of 6N sulfuric acid. The two solutions are then mixed. The solvent is evaporated at 102°C.

A mixed copper II iron II sulfate crystal is formed. Upon heating at 200°C copper II ferrite is formed. This copper II ferrite meets the appropriate electronic requirement for use as a material in the memory device of a high speed digital computer.

EXAMPLE II

The procedure of Example I is repeated using Nickel II sulfate in place of $CuSO_4 \cdot 5H_2O$. Nickel ferrite having appropriate electronic values for use in high-speed digital computers is recovered.

EXAMPLE III–VI

The procedure of example I is repeated using successively manganese II sulfate, magnesium sulfate, zinc sulfate and the mixed sulfate of magnesium and manganese. In each example an appropriate ferrite is produced having the desired properties.

EXAMPLE VII

The procedure of Example I is repeated except that the $FeSO_4 \cdot 7H_2O$ and $CuSO_4 \cdot 5H_2O$ are dissolved together in the same solution. A desirable copper ferrite is obtained.

Obviously many modifications and variations of the present invention are possible in the light of the above teachings. It is therefore to be understood that within the scope of the appended claims the invention may be practiced otherwise than as specifically described.

What is claimed as new and desired, to be secured by Letters Patent of the United States is:

1. A process for forming a metallic ferrite comprising:
   a. forming a solution of ferrous sulfate and a metallic sulfate in water acidified with sulfuric acid, wherein the mole ratio of ferrous sulfate to metallic sulfate varies from 1:1 to 4:1, and wherein the metallic sulfate is selected from the group consisting of nickel sulfate, manganese sulfate, copper sulfate, magnesium sulfate, zinc sulfate and a mixture of manganese sulfate and magnesium sulfate;
   b. evaporating the solvent to form a mixed sulfate crystal;
   c. recovering the mixed sulfate crystal;
   d. heating the mixed sulfate crystal to form a metallic ferrite.

2. The process of claim 1 wherein the solution is formed by making separate solution of ferrous sulfate and metallic sulfate, and then mixing the solutions at a temperature ranging from 20°C to 110°C.

3. The process of claim 2 wherein the metallic sulfate is selected from the group consisting of nickel II sulfate, manganese II sulfate, and copper II sulfate.

4. The process of claim 1 wherein copper II ferrite is prepared by forming a solution containing 67% by weight of $FeSO_4 \cdot 7H_2O$ and 33% $CuSO_4 \cdot 5H_2O$ in water acidified with sulfuric acid and the heating is at temperature of 200°C.

5. The process of claim 4 wherein forming the solution is accomplished at a temperature of about 100°C.

6. The process of claim 5 wherein the solutions are saturated solutions.

7. The process of claim 5 wherein the concentration of sulfuric acid is 100 parts water to 1 part 6 normal sulfuric acid.

8. The process of claim 1 wherein the heating is a temperature of at least 200°C.

9. The process of claim 8 wherein the ratio of ferrous sulfate to metallic sulfate is 2:1.

10. The process of claim 9, wherein the solvent comprises water and 6 normal sulfuric acid at a ratio of 100 parts water to 1 part 6 normal sulfuric acid.

11. The process of claim 10 wherein the solutions are mixed at about 100°C.

12. The process of claim 11 wherein the solutions are saturated solutions.

* * * * *